US007139113B1

(12) United States Patent
Chu et al.

(10) Patent No.: US 7,139,113 B1
(45) Date of Patent: Nov. 21, 2006

(54) DIGITAL MICRO-MIRROR DEVICE WITH FREE STANDING SPRING TIPS AND DISTRIBUTED ADDRESS ELECTRODES

(75) Inventors: Henry C. Chu, Plano, TX (US); Cuiling Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/192,785

(22) Filed: Jul. 29, 2005

(51) Int. Cl.
*G02B 26/00* (2006.01)

(52) U.S. Cl. ..................... 359/291; 359/290

(58) Field of Classification Search .............. 359/290, 359/291, 223, 224, 238
See application file for complete search history.

(56) References Cited

U.S. PATENT DOCUMENTS 5,706,123 A * 1/1998 Miller et al. ................ 359/291

* cited by examiner

*Primary Examiner*—Timothy Thompson
*Assistant Examiner*—Jerry Fang
(74) *Attorney, Agent, or Firm*—Charles A. Brill; Wade James Brady, III; Frederick J. Telecky, Jr.

(57) ABSTRACT

According to one embodiment of the present invention a micro-mirror element comprises a first address portion, a second address portion, and one or more address vias. The first address portion comprises a plurality of address pads distributed in a first layer of the micro-mirror element. The micro-mirror element has a first side and a second side and at least two of the plurality of address pads are distributed on the first side. The second address portion comprises a plurality of address electrodes distributed in a second layer of the micro-mirror element. The one or more address vias are operable to conductively couple the first address portion to the second address portion for the transfer of an address voltage from the first address portion to the second address portion. The distribution of the address pads of the first address portion and the address electrodes of the second address portion causes an electrostatic force provided by the second address portion to be greater than an electrostatic force provided by the first address portion.

20 Claims, 5 Drawing Sheets

DIGITAL MICRO-MIRROR DEVICE WITH FREE STANDING SPRING TIPS AND DISTRIBUTED ADDRESS ELECTRODES

TECHNICAL FIELD OF THE INVENTION

This invention relates in general to image display systems, and more particularly to a digital micro-mirror device with free standing spring tips and distributed address electrodes.

BACKGROUND

Spatial light modulators are capable of being used in optical communication and/or projection display systems. Where spatial light modulators are used in projection display systems, such spatial light modulators are often capable of projecting image details from media sources such as HDTV, DVD, and DVI. Some conventional spatial light modulators typically include an array of pixel elements that are capable of receiving an optical signal or light beam in one tilt or principal ray direction. Typically, each such pixel element includes a monolithically integrated MEMS superstructure cell comprised of a mirror, a beam or binge layer, and a metal 3 layer. The various components in the beam and metal 3 layers cooperate to manipulate the mirror portion for the reflection of light and the production of an image. Proper alignment of the mirror with respect to the metal 3 layer is desired for the micro-mirror element to function properly and reliably.

SUMMARY OF THE INVENTION

According to one embodiment of the present invention a micro-mirror element comprises a first address portion, a second address portion, and one or more address vias. The first address portion comprises a plurality of address pads distributed in a first layer of the micro-mirror element. The micro-mirror element has a first side and a second side and at least two of the plurality of address pads are distributed on the first side. The second address portion comprises a plurality of address electrodes distributed in a second layer of the micro-mirror element. The one or more address vias are operable to conductively couple the first address portion to the second address portion for the transfer of an address voltage from the first address portion to the second address portion. The distribution of the address pads of the first address portion and the address electrodes of the second address portion causes an electrostatic force provided by the second address portion to be greater than an electrostatic force provided by the first address portion.

Depending on the specific features implemented, particular embodiments of the present invention may exhibit some, none, or all of the following technical advantages. A technical advantage may be a unique distribution of metal with respect to the address and bias portions of each layer of a pixel element. For example, an advantage may be that the metal associated with the bias and address portions of a metal 3 layer of the pixel element may be more evenly distributed throughout the metal layer. As a result, a flatter mirror may be obtained. As another example, the metal associated with the address portions of a beam layer may be increased for the obtainment of a wider address electrode in the beam layer. The resulting configuration may render a shift in the contribution of electrostatic forces produced by the respective layers. Accordingly, the configuration may operate to significantly reduce the pixel element's sensitivity to translational misalignment between the mirror and the first layer of the micro-mirror element. Thus, a further advantage may be that the pixel element exhibits improved performance even where photo induced processes result in translational misalignment of the respective layers.

An additional advantage may be that one or more spring tips in the beam layer may be positioned further from a hinge than in conventional pixel designs. Yet another advantage may be a configuration that increases the vertical gap between the layers of the pixel element and decreases the resulting DMD pixel element's electrostatic sensitivity. Still yet other advantages may include a flatter mirror topography, decreased light loss, and improved brightness of the displayed image.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

A new optical system and method have been developed that improve, in some embodiments, the performance, reliability and optical efficiency of a DMD pixel element. According to particular embodiments of the present invention, a pixel element includes a lower or "metal 3" layer, a middle or "binge" layer, and a mirror layer. In particular embodiments, the amount of metal associated with the address portions of the binge layer is increased and the amount of metal associated with the address portions of the metal 3 layer is decreased. The described distribution of metal within the respective layers results in a shift in the contribution of electrostatic forces produced by the layers. Specifically, the contribution of electrostatic forces provided by the metal 3 layer is decreased, and the contribution of electrostatic forces provided by the binge layer is increased. Since the electrostatic forces provided by the hinge layer are not sensitive to the misalignment between the mirror and the hinge layer, the resulting DMD pixel element's sensitivity to translational misalignment may be reduced, and the DMD pixel element may exhibit improved performance even where photo induced processes result in translational misalignment of the respective layers.

Figure 1:
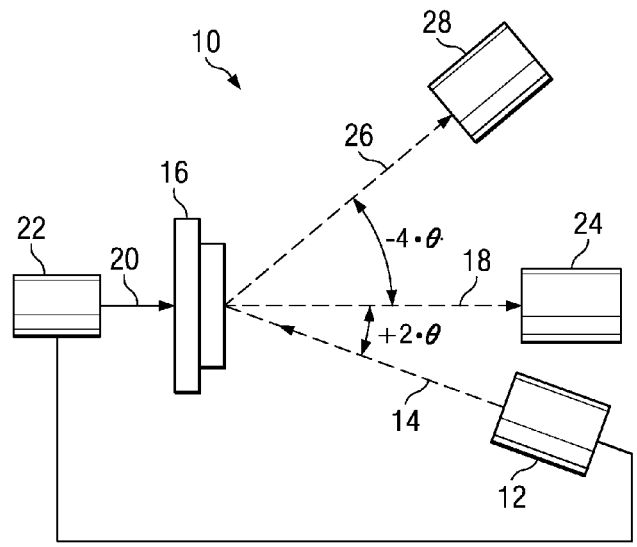
FIG. 1 is a block diagram of one embodiment of a portion of a display system.

FIG. 1 is a block diagram of one embodiment of a portion of a display system 10. In this example, display system 10 includes a light source module 12 capable of generating illumination light beams 14. Light beams 14 are directed from light source module 12 to a modulator 16. Modulator 16 may comprise any device capable of selectively communicating at least some of the received light beams along a projection light path 18. In various embodiments, modulator 16 may comprise a spatial light modulator, such as, for example, a liquid crystal display, a light emitting diode modulator, or a liquid crystal on silicon display. In the illustrated embodiment, however, modulator 16 comprises a digital micro-mirror device (DMD).

As will be described in more detail below, a DMD is a micro electromechanical device comprising an array of hundreds of thousands of tilting digital micro-mirrors. In a flat state, each micro-mirror may be substantially parallel to projection lens 24. From the flat state, the micro-mirrors may be tilted, for example, to a positive or negative angle corresponding to an "on" state and an "off" state. For discussion purposes, the angle at which the mirrors may tilt will be measured from projection path 18 and may be designated as theta. In particular embodiments, the micro-mirrors may tilt from +10 degrees to a −10 degrees. In other embodiments, micro-mirrors may tilt from a +12 degrees to a −12 degrees. To permit the micro-mirrors to tilt, each micro-mirror attaches to one or more hinges mounted on support posts, and spaced by means of an air gap over underlying control circuitry. The control circuitry provides the desired voltages to the respective layers, based at least in part on image data 20 received from a control module 22. In various embodiments, modulator 16 is capable of generating various levels or shades for each color received.

The electrostatic forces cause each micro-mirror to selectively tilt. Incident illumination light on the micro-mirror array is reflected by the "on" micro-mirrors along projection path 18 for receipt by projection lens 24. Additionally, illumination light beams 14 are reflected by the "off" micro-mirrors and directed on off-state light path 26 toward light dump 28. The pattern of "on" versus "off" mirrors (e.g., light and dark mirrors) forms an image that is projected by projection lens 24. As used in this document, the terms "micro-mirrors" and "pixels" are used inter-changeably.

Light source module 12 includes one or more lamps or other light sources capable of generating and focusing an illumination light beam. Although display system 10 is described and illustrated as including a single light source module 12, it is generally recognized that display system 10 may include any suitable number of light sources modules appropriate for generating light beams for transmission to modulator 16.

In particular embodiments, light source module 12 is positioned such that light beam 14 is directed at modulator 16 at an illumination angle of twice theta (where theta is equal to the degree of tilt of the micro-mirror). For example, where the micro-mirrors tilt from approximately +10 to +12 degrees ("on") to approximately −10 to −12 degrees ("off"), light beam 14 may be directed at modulator 16 from light source module 12 positioned at an angle of approximately +20 to +24 degrees from projection path 18. Accordingly, light beam 14 may strike modulator 16 at an angle of approximately +20 to +24 degrees relative to the normal of the micro-mirrors when the micro-mirrors are in a flat state or an untilted position.

Off state light path 26 is at a negative angle that is approximately equal to four times theta. Thus, where the micro-mirrors are positioned at approximately −10 to −12 degrees when in the "off" state, light beam 14 is reflected at an angle of approximately −40 to −48 degrees as measured from projection path 18.

As discussed above, display system 10 includes a control module 22 that receives and relays image data 20 to modulator 16 to effect the tilting of micro-mirrors in modulator 16. Specifically, control module 22 may relay image data 20 that identifies the appropriate tilt of the micro-mirrors of modulator 16. For example, control module 22 may send image data 20 to modulator 16 that indicates that the micro-mirrors of modulator 16 should be positioned in the "on" state. Accordingly, the micro-mirrors may be positioned at a tilt angle on the order of approximately +10 to +12 degrees, as measured from projection path 18. Alternatively, control module 22 may send image data 20 to modulator 16 that indicates that the micro-mirrors should be positioned in the "off" state. As such, the micro-mirrors may be positioned at a tilt angle on the order of approximately −10 to −12 degrees, as measured from projection path 18.

Figure 2:
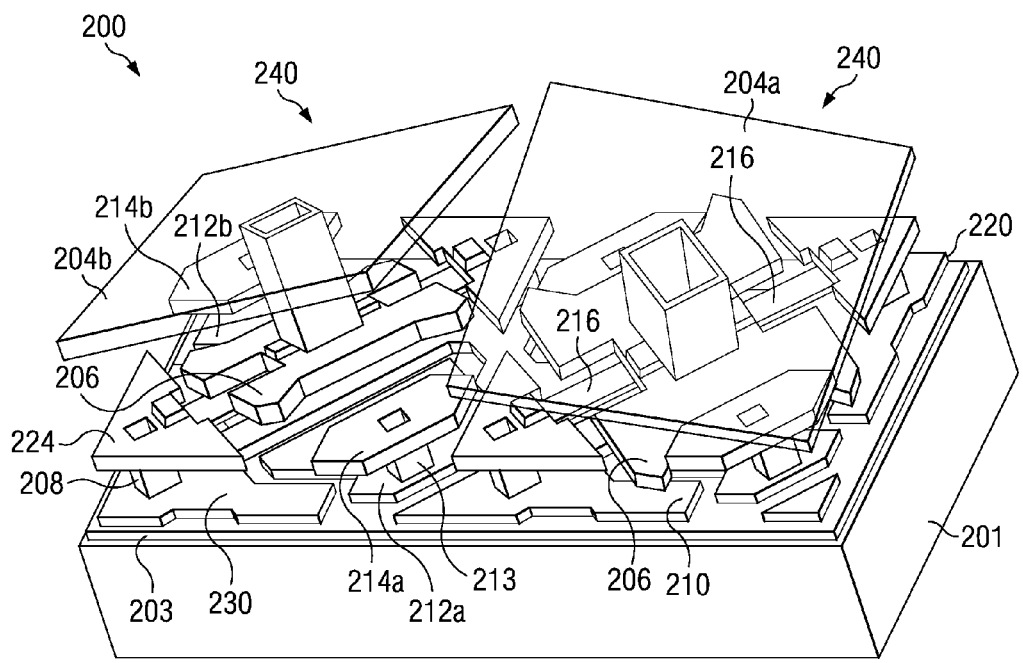
FIG. 2 illustrates an example configuration of a conventional digital micro-mirror device (DMD) pixel element.

FIG. 2 illustrates an example configuration of a conventional DMD pixel element 200. As discussed above with regard to modulator 16 of FIG. 1, DMD 200 may include an array of hundreds of thousands of tilting digital micro-mirrors. Each micro-mirror may be on an individually addressable DMD pixel element 240. Although DMD 200 includes many of such DMD pixel elements 240, for illustration purposes, only two DMD pixel elements 240 are shown in FIG. 2.

Each DMD pixel element 240 may generally include a superstructure cell fabricated monolithically over a complementary metal-oxide semiconductor ("CMOS") substrate 201. In particular embodiments, the CMOS substrate 201 includes component parts of control circuitry operable to manipulate the DMD pixel element 240. For example, the CMOS substrate 201 may include an SRAM cell or other similar structure for performing the operations of DMD pixel element 240. Each DMD pixel element 240 may generally include a mirror portion, a hinge portion, and an address portion.

The mirror portion of the DMD pixel elements 240 in the illustrated embodiment uses a reflective material such as aluminum or other material to reflect incident light to produce an image through projection lens 24. In some embodiments, the reflective material may be a micro-mirror 204. In particular embodiments, the micro-mirror 204 may be approximately 13.7 microns in size and have approximately a one micron gap between adjacent micro-mirrors. The described dimensions, however, are merely one example configuration of micro-mirrors 204. It is generally recognized that, in other embodiments, each micro-mirror 204 may be smaller or larger than the above described example. For example, in particular embodiments, each micro-mirror may be less than thirteen microns in size. In other embodiments, each micro-mirror may be approximately seventeen microns in size.

The hinge portion of the DMD pixel elements 240, in the illustrated embodiment, includes one or more hinges 216 mounted with beams 224, which are supported by hinge posts or hinge vias 208. The hinges 216 may be made of aluminum, titanium, tungsten, aluminum alloys, such as AlTiO, or other material suitable for supporting and manipulating micro-mirrors 204. In operation, the one or more hinges 216 may be used to tilt each micro-mirror 204 such that the micro-mirrors 204 may be alternated between an active "on" state or an active "off" state. For example, and as described above with regard to FIG. 1, hinges 216 may operate to tilt micro-mirrors 204 from a plus ten degrees to a minus ten degrees to alternate the micro-mirrors 204 between the active "on" state condition and the active "off" state condition, respectively. In other example embodiments, however, hinges 216 may operate to tilt micro-mirrors 204 from a plus twelve degrees to a minus twelve degrees to alternate the micro-mirrors 204 between the active "on" state and the active "off" state, respectively.

The micro-mirrors 204 are generally supported above the hinge 216 by a mirror via 202. In the illustrated embodiment, the range of motion given to micro-mirrors 204 may be limited by a yoke 206. Thus, micro-mirrors 204 may be tilted in the positive or negative direction until the yoke 206 (coupled to or integrated with the hinge 216) contacts a contact point 210 of a bias pad 230. Although this example includes yoke 206, however, for limiting the motion of micro-mirrors 204 to a desired range, it is generally recognized that other embodiments may eliminate the yoke 206. For example, it is generally recognized that micro-mirrors 204 may tilt in the positive or negative direction until the micro-mirrors 204 contact a mirror stop or spring tip (shown and described in more detail with regard to FIGS. 3B–3C).

The address portion of the DMD pixel elements 240, in the illustrated embodiment, includes a pair of address pads 212a, 212b and address electrodes 214a, 214b. Address vias 213 may generally couple the address electrodes 214a, 214b to a portion of the address pads 212a, 212b. The address electrodes 214a, 214b that carry a control or address voltage are in closer proximity to the micro-mirrors 204 when the mirrors tilt. Further details of the control or address voltage are described below.

In the illustrated embodiment, the address pads 212a, 212b and the bias pad 230 are formed within a conductive layer 220 (also referred to sometimes as a Metal 3 or M3 layer). The conductive layer 220 is disposed outwardly from an oxide layer 203, which operates as an insulator. For example, the oxide layer 203 may at least partially insulate CMOS substrate 201 from address pads 212a, 212b and bias pad 230. As another example, the oxide layer 203 may additionally or alternatively operate to at least partially insulate the address electrodes 212a, 212b from the bias pad 230.

In operation, portions of the DMD pixel elements 240 may receive a bias voltage that at least partially contributes to the creation of the electrostatic forces (e.g., a voltage differential) between the address portions, which includes the address pads 212 and the address electrodes 214, and the micro-mirrors 204. Additionally or alternatively, the bias voltage may contribute to the creation of electrostatic forces between the address portions of the DMD pixel elements 240 and the yoke 206. For example, a bias voltage may be applied to the bias pad 230. The bias voltage may conductively travel from bias pad 230 through hinge vias 208, hinge 216, yoke 206, and mirror via 202 to micro-mirror 204. In particular embodiments, the bias voltage comprises a steady-state voltage. That is, the bias voltage applied to portions of the DMD pixel element 240 remains substantially constant while the DMD 200 is in operation. In particular embodiments, the bias voltage is on the order of approximately twenty-six volts. However, the described bias voltage is merely one example of a bias voltage that may be used to operate DMD 200. It is generally recognized that other bias voltages may be used without departing from the scope of the present disclosure.

As described above, CMOS substrate 201 comprises control circuitry associated with DMD 200. The control circuitry may comprise any hardware, software, firmware, or combination thereof capable of at least partially contributing to the creation of the electrostatic forces between the address portions (e.g., the address pad 212 and the address electrodes 214) and the micro-mirrors 204 and/or the address portions and the yoke 206. The control circuitry associated with CMOS substrate 201 functions to selectively transition micro-mirrors 204 between "on" and "off" states based at least in part on data received from a controller or processor (shown in FIG. 1 as reference numeral 22).

The illustrated example embodiment includes two micro-mirrors 204 disposed adjacent to one another. Micro-mirror 204a may represent a micro-mirror in the active "on" state condition. Conversely, micro-mirror 204b may represent a micro-mirror in the active "off" state condition. Thus, the control circuitry associated with CMOS substrate 201 transitions micro-mirrors 204 between "on" and "off" states by selectively applying an address or control voltage to at least one of the address electrodes 212a, 212b associated with a particular micro-mirror 204. In particular embodiments, the control voltage is on the order of approximately three volts. Accordingly, to transition micro-mirror 204b, for example, to the active "on" state condition, the control circuitry removes the control voltage from electrode 212a (reducing, for example, electrode 212a from three volts to zero volts) and applies the control voltage to electrode 212b (increasing, for example, electrode 212b from zero volts to three volts) while the micro-mirror receives reset voltages. During such activity, at least a portion of an electrostatic force (or voltage differential) may be created between the yoke 206 and the address electrode 212a. Similarly, another portion of an electrostatic force may be created between the micro-mirror 204a and the elevated address electrode 214a. The combination of the electrostatic forces may selectively create a torque force that transitions the micro-mirror 204b to the active "on" state. Although a control voltage of three volts is described above, a control voltage of three volts is merely one example of a control voltage that may be selectively applied to address electrodes 212a, 212b. It is generally recognized that other control voltages may be used without departing from the scope of the present disclosure.

By combining the DMD 200 with a suitable light source and projection optics (described above with regard to FIG. 1), the micro-mirror 240 may reflects incident light either into or out of the pupil of the projection lens 24. Thus, the "on" state of the DMD pixel element 240 appears bright and the "off" state of the DMD pixel element 240 appears dark. Gray scale may be achieved by binary pulse width modulation of the incident light. Color may be achieved by using color filters, either stationary or rotating, in combination with one, two, or three DMDs 200.

Figure 3A:
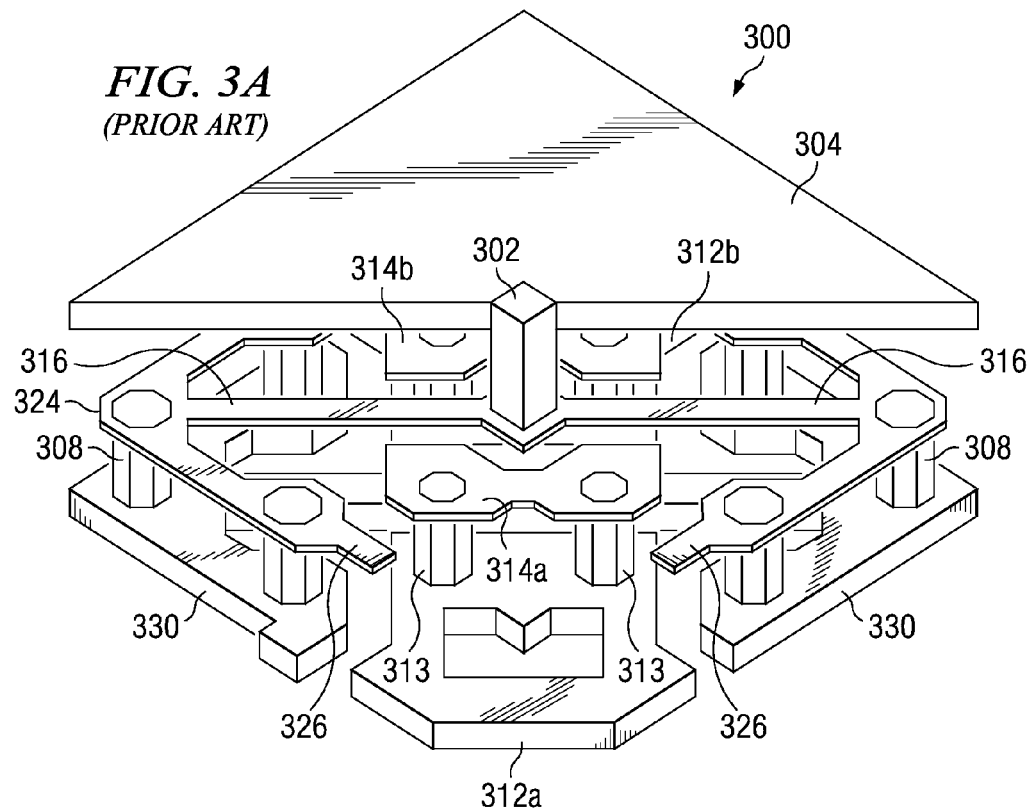
FIG. 3A illustrates another configuration of a conventional digital micro-mirror device (DMD) pixel element.
Figure 3B:
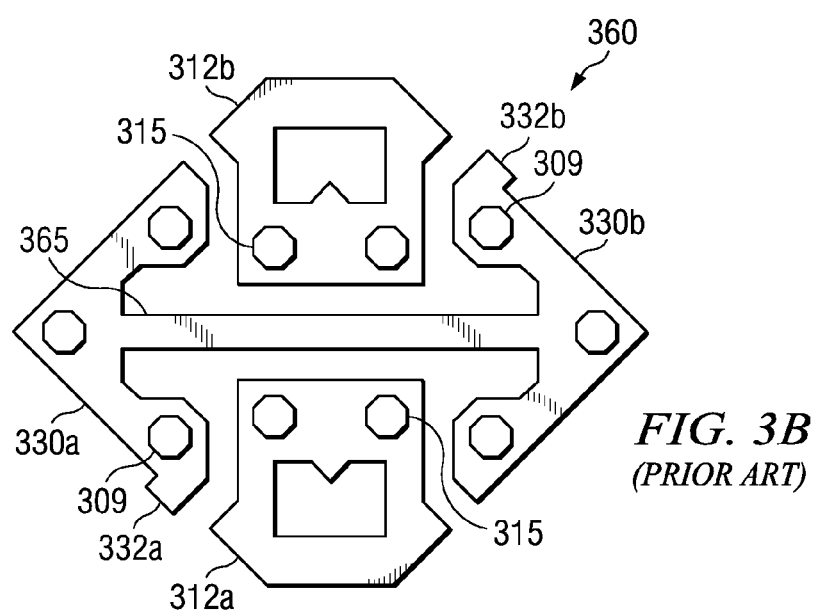
FIGS. 3B and 3C generally illustrate top isolated views of components of the conventional DMD pixel element of FIG. 3A as divided into a lower layer and a middle layer, respectively.
Figure 3C:
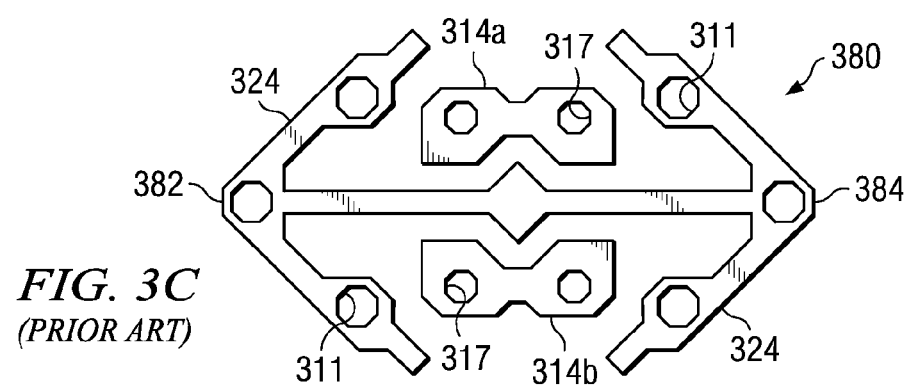

FIGS. 3A–3C illustrate additional details of another conventional DMD pixel element 300. Although a different configuration than DMD pixel element 200 of FIG. 2, the assembled DMD pixel element 300 that is illustrated in FIG. 3A may operate in a similar manner to the DMD pixel element 200. For example, similar to the DMD pixel element 200, the DMD pixel element 300 of FIG. 3 may include a hinge portion, an address portion, and a mirror portion. Although some components within the hinge portion, the address portion, and the mirror portion may remain the same, the configuration of other components within each portion may vary slightly from that described above with regard to FIG. 2. For example, in the illustrated embodiment, the mirror portion includes a micro-mirror 304, which may be similar or different than the micro-mirror 204 of FIG. 2.

The hinge portion includes a hinge 316, supported on each side by hinge posts. As will be described in more detail with regard to FIG. 3B, six bias vias 308 support spring tips 326 and hinge 316 above the lower layer 360. The bias vias 308 may also operate to relay a bias voltage to hinge 316. Micro-mirror 304 is supported above the hinge 316 upon a single mirror via 302. In addition to providing support for the micro-mirror 304, the mirror via 302 may conductively transfer the bias voltage to the micro-mirror 304. Accordingly, in a manner similar to that described above, a bias voltage may be applied to the bias pad 330. The bias voltage may then be conductively transferred to the spring tips 326 and hinge 316 through the six bias vias 308. The bias voltage may be then further transferred from the hinge 316 to the micro-mirror 304 through the mirror via 302.

The address portion of the DMD pixel element 300 includes two address pads 312a, 312b that each connect to raised address electrodes 314a, 314b, respectively. Address pads 312a, 312b and the raised address electrodes 314a, 314b are illustrated in more detail with respect to FIGS. 3B and 3C, respectively. As illustrated in FIG. 3A, address vias 313 support the raised address electrodes 314a, 314b above each address pad 312a, 312b. In addition to supporting the raised address electrodes 314a, 314b, the address vias 313 relay a control or address voltage from the address pads 312a, 312b to the raised address electrodes 314a, 314b. In a manner similar to that described above with reference to FIG. 2, the address pads 312a, 312b may be in communication with a control circuitry, such as an SRAM cell or the like, which selectively applies a control or address voltage to one of the two address pads 312a, 312b to create an electrostatic force between the micro-mirror 304 and the raised address electrodes 314a, 314b. A similar electrostatic force may be created between the micro-mirror 304 and the address pads 312a, 312b.

The range of motion allowed to micro-mirrors 304 may be limited by spring tips 326. During operation of DMD pixel element 300, spring tips 326 provide a landing point for micro-mirror 304. For example, when micro-mirror 304 is tilted in the direction of the raised address electrode 314a and address pad 312a, one or more spring tips 326 positioned proximate these address elements may operate as a landing point for micro-mirror 304. Conversely, when micro-mirror 304 is tilted in the direction of the raised address electrode 314b and address pad 312b, one or more spring tips 326 positioned proximate these address elements may operate as a landing point for micro-mirror 304. Thus, micro-mirror 304 may be tilted in the positive or negative direction until the micro-mirror 304 contacts one or more spring tips 326.

FIGS. 3B and 3C illustrate top isolated views of the components of the conventional DMD pixel element 300 of FIG. 3A as divided into a lower layer 360 and an upper layer 380, respectively. Although the term "layer" is utilized in this description, it is recognized that the component parts of lower layer 360 may not necessarily lie in the same plane. Specifically, FIG. 3B illustrates a top isolated view of the lower layer 360, which may also be referred to as a Metal 3 or M3 layer, of the DMD pixel element 300. The DMD pixel element 300 is substantially configured in the shape of a square. Accordingly, the components of the lower layer 360 are also substantially configured in the shape of a square. There are two bias pads 330a and 330b that are coupled by an arm 365 that extends substantially across the width of the lower layer 360. For the application of a bias voltage, bias pads 330 include areas 308 that identify the proximate location for the formation of bias vias 308 (shown in FIG. 3A). Each bias pad 330 includes three areas 309 for the formation of three bias vias 308. Collectively, bias pads 330a, 330b include six areas 309 for the formation of six bias vias 308.

Lower layer 360 also includes two address pads 312a and 312b separated by an arm 365. For the application of a control voltage, address pads 312a, 312b include areas 315 that identify the proximate location for the formation of address vias 313 (shown in FIG. 3A). Each address pad 312 includes two areas 315 for the formation of two address vias 313. Accordingly, address pads 312a, 312b collectively include four areas 315 for the formation of four address vias 313.

When DMD pixel elements 300 are positioned adjacent one another, bias voltages may be relayed between adjacent DMD pixel elements 300 through bias portions 332a, 332b. For example, a bias portion 332a of a first DMD pixel element may be electrically coupled to a bias portion 332b of a second DMD pixel element. In a single DMD pixel element, a bias signal flow path may generally exist between such bias portions 332a, 332b. For example, with reference to FIG. 3B, a bias signal flow bath could flow from bias portion 332a through bias pad 330a, arm 365, and bias pad 330b to bias portion 332b, or vice versa. A main bias signal flow path may generally be the shortest electrical route between bias portions 332a, 332.

FIG. 3C illustrates a top isolated view of a middle layer 380, which may also be referred to as beam/hinge or "binge" layer, of the DMD pixel element 300 of FIG. 3C. Although the term "layer" is utilized in this description, it is recognized that the component parts of middle layer 380 may not necessarily lie in the same plane. As illustrated in FIG. 3A, the size and shape of middle layer 380 corresponds generally with the size and shape of lower layer 360.

The middle layer 380 includes four spring tips 326, two beams 324a, 324b, a hinge 316, and two address electrodes 314a, 314b. A first beam 324a is disposed proximate a first corner 382 of middle layer 380, and a second beam 324b is disposed proximate a second corner 384 of middle layer 380. As illustrated, the hinge 316 extends substantially across the width of the middle layer 380. For coupling the bias pads 330 of the lower layer 360 with beams 324, each beam 324a, 324b includes areas 311 that identify the proximate location for the formation of bias vias 308 (shown in FIG. 3A). Accordingly, where three bias vias 308 are desired for supporting each beam 324a, 324b, each beam 324a, 324b includes three areas 311 for the formation of bias vias 308. As described above, a bias voltage applied to the bias pads 330 of the lower layer 360 may be transferred to beams 324 through bias vias 308.

The middle layer 380 also includes two raised address electrodes 314a and 314b, which are disposed on each side of hinge 316. For coupling the address pads 312 of the lower layer 360 to the address electrodes 314 of the middle layer 380, address electrodes 314a, 314b include areas 317 that identify the proximate location for the formation of address vias 313 (shown in FIG. 3A). Each address electrode 314a, 314b includes two areas 317 for the formation of two address vias 313. Accordingly, address electrodes 314a, 314b collectively include four areas 317 for the formation of four address vias 313. As described above, a control voltage applied to the address pads 312 of the lower layer 360 may be transferred to address electrodes 314 through address vias 313. The control voltage may then be transferred to an upper layer, which comprises the micro-mirror 304, for the selective tilting of micro-mirror 304 to an "off" state or an "on" state.

Because the DMD pixel element of FIGS. 3A–3C includes wide address pads 312a, 312b in the lower layer 360 and relatively smaller raised address electrodes 314a, 314b in the middle layer 380, the lower layer 360 may contribute more electrostatic forces to the pixel element 300 than middle layer 380. Since the electrostatic forces contributed from the lower layer 360 is sensitive to the misalignment between the mirror and the lower layer, the DMD pixel element 300 is sensitive to translational misalignment of the mirror 304 with respect to the lower layer 360. Teachings of embodiments of the invention, however, recognize configurations which may reduce the sensitivity of a DMD pixel element to such misalignment.

Figure 4A:
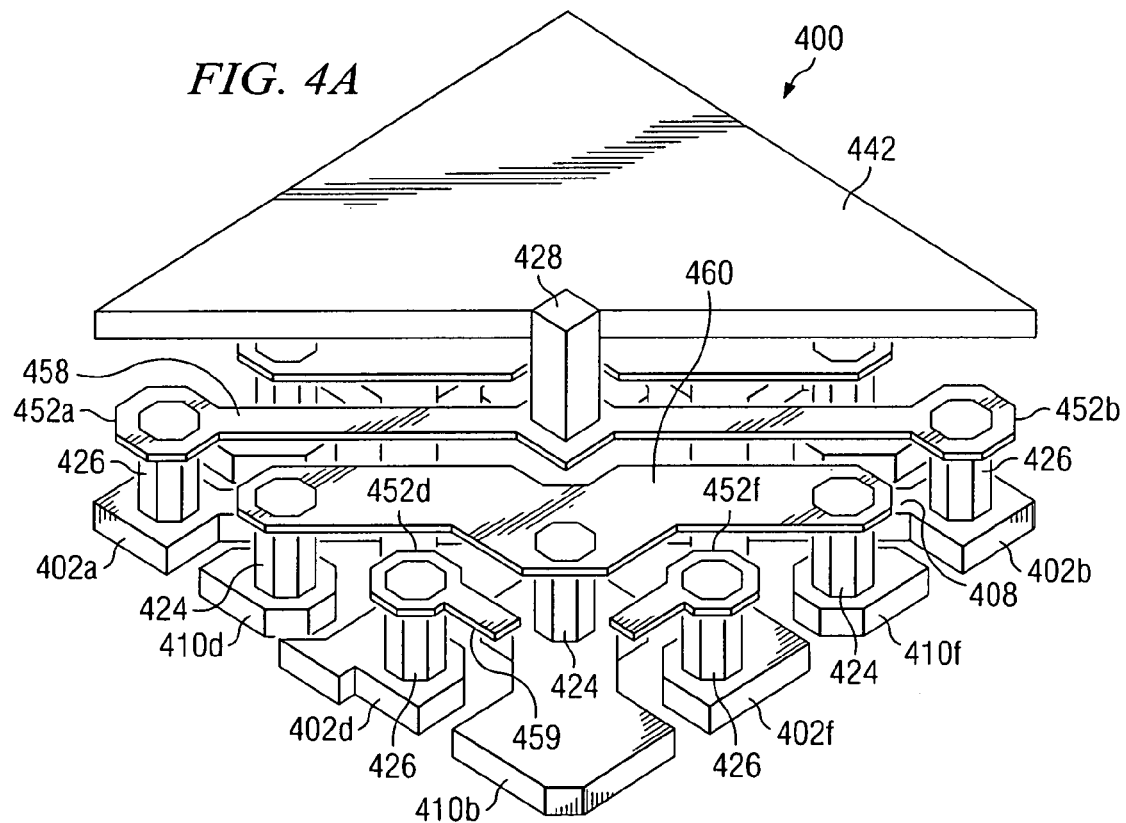
FIG. 4A illustrates a DMD pixel element 400, according to an embodiment of the invention.

FIG. 4A illustrates a DMD pixel element 400, according to an embodiment of the invention. The DMD pixel element 400 of FIG. 4A includes a micro-mirror 442, address pads 410, bias pads 402, bias arms 408, beam portions 452, spring tips 459, address electrode 460, address vias 424, bias vias 426, a hinge 458, and a mirror via 428. Further details of the above components are described with reference to FIGS. 4B and 4C.

Figure 4B:
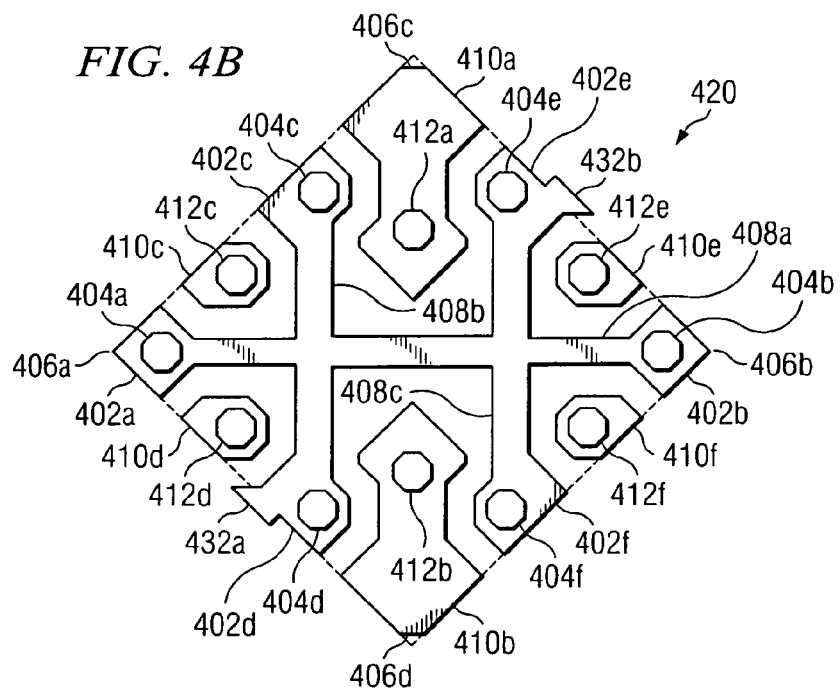
FIGS. 4B and 4C illustrate top isolated views of components of the embodiment of DMD pixel element of FIG. 4A as divided into a lower layer and a middle layer, respectively.
Figure 4C:
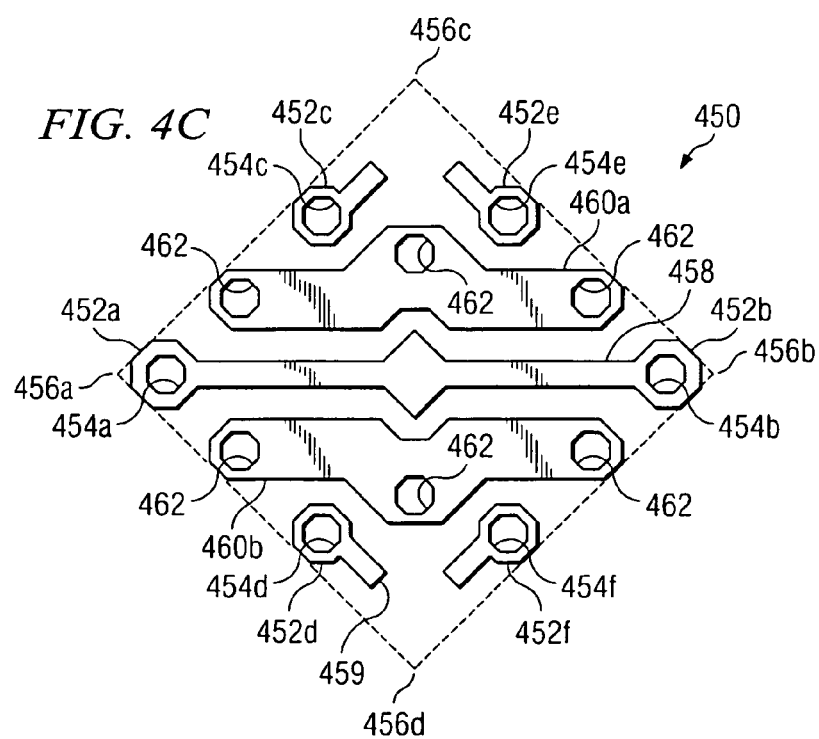

FIGS. 4B and 4C illustrate top isolated views of components of the embodiment of the DMD pixel element 400 of FIG. 4A as divided into a lower layer 420 and a middle layer 450. Although the term "layer" is utilized in this description, it is recognized that the component parts of each of the lower layer 420 and the middle layer 450, respectively, may not necessarily lie in the same plane. It is further recognized that when the components of the lower layer 420 and the middle layer 450 are assembled, the middle layer 450 may be transposed generally over the lower layer 420. In particular embodiments, a DMD pixel element 400 that incorporates the lower layer 420 and the middle layer 450 exhibits reduced sensitivity to translational misalignment since the electrostatic contribution of the respective layers is shifted. Specifically, a DMD pixel element incorporating lower layer 420 and middle layer 450 is less sensitive to translational misalignment because the electrostatic contribution from the lower layer 420 is reduced and the electrostatic contribution from the middle layer 450 is increased.

In the illustrated embodiment of FIG. 4B, lower layer 420, which may be referred to as a Metal 3 or M3 layer of the DMD pixel element, includes multiple bias pads 402 for supporting bias vias (seen in FIG. 4A). To decrease the amount of metal associated with each bias pad 402 and more evenly distribute the metal of the bias portions of lower layer 420 throughout the lower layer 420, each bias pad 402 may be associated with a single bias via (seen in FIG. 4A). Accordingly, each bias pad 402 includes an area 404 that identifies the proximate location for the formation of a single bias via. Thus, in particular embodiments where six bias vias are desired to support the bias portions of middle layer 450 respective to the bias portions of lower layer 420, lower layer 420 includes six bias pads 402 distributed within lower layer 420. It is recognized, however, that fewer or more bias pads 402 may be incorporated into lower layer 420 as is appropriate for the application of a bias voltage to lower layer 420.

To further improve the distribution of the metal associated with bias portions of lower layer 420, the six bias pads 402 illustrated in FIG. 4B are distributed around the perimeter of the lower layer 420 in a substantially even manner. For example, a first bias pad 402a is positioned proximate a first corner 406a of the lower layer 420, and a second bias pad 402b is positioned proximate a second corner 406b of lower layer 420. As illustrated, the first and second corners 406a and 406b of lower layer 420 oppose one another such that first and second bias pads 402a, 402b may be said to be opposing bias pads. A first bias arm 408 couples the first and second bias pads 402a, 402b and extends substantially across the width of the lower layer 420.

In the illustrated embodiment, the lower layer 420 also includes a third bias pad 402c, a fourth bias pad 402d, a fifth bias pad 402e, and a sixth bias pad 402f. Third and fourth bias pads 402c, 402d are positioned equidistantly on either side of first arm 408a such that third and fourth bias pads 402c, 402d form opposing bias pads positioned at opposing positions along the perimeter of lower layer 420. As illustrated, third and fourth bias pads 402c, 402d are coupled by a second bias arm 408b. Fifth and sixth bias pads 402e, 402f are configured similarly to third and fourth bias pads 402c, 402d, respectively. Thus, fifth and sixth bias pads 402e, 402f are positioned equidistantly on either side of first arm 408a such that fifth and sixth bias pads 402e, 402f form opposing bias pads positioned at opposing positions along the perimeter of lower layer 420. Fifth and sixth bias pads 402e, 402f are coupled by a third bias arm 408c. Because first arm 408a, second arm 408b, and third arm 408c operate to couple each bias pad 402a–402f to every other bias pad 402a–402f, the resulting bias portion of lower layer 420 includes an integrated structure that is distributed in a substantially even manner throughout lower layer 420.

In the illustrated embodiment, the lower layer 420 also includes bias portions 432a, 432b, which may operate in a similar manner to the bias portions 332a, 332b described above with reference to FIG. 3B. A main bias signal flow path may generally be the shortest electrical route between bias portions 432a and 432b. Therefore, bias pads 402a, 402b, 402c, and 402f do not lie in the main bias signal flow path. As described in further details below, beam portions 452a, 452b, 454c, 454f in the middle layer 450 may respectively receive the bias voltage from bias pads 402a, 402b, 402c, and 402f.

For applying a control or address voltage, lower layer 420 also includes multiple address pads 410. To decrease the amount of metal associated with each address pad 410 and more evenly distribute the metal of the address portions of lower layer 420 throughout the lower layer 420, each address pad 410 is associated with a single address via (seen better in FIG. 4A). Accordingly, each address pad 410 includes an area 412 that identifies the proximate location for the formation of an address via. Thus, in particular embodiments where six address vias are desired to support address portions of middle layer 450 respective to the address portions of lower layer 420, lower layer 420 includes six address pads 410a–410f distributed within lower layer 420. It is generally recognized, however, that fewer or more address pads 410 may be incorporated into lower layer 420 as is appropriate for the application of a control voltage to lower layer 420.

To further improve the distribution of the metal associated with the address portions of lower layer 420, each address pad 410a–410f is positioned to separate each bias pad 402a–402f from every other bias pad 402a–402f. For example, a first address pad 410a is disposed proximate a third corner 406c of the lower layer 420, and a second address pad 410b is disposed proximate a fourth corner 406d of the lower layer 420. As a result, first address pad 410a is positioned between third bias pad 402c and fifth bias pad 402e along the perimeter of lower layer 420. Similarly, second address pad 410b is positioned between fourth bias pad 402d and sixth bias pad 402f along the perimeter of lower layer 420.

In the illustrated embodiment, the lower layer 420 also includes a third address pad 410c, a fourth address pad 410d, a fifth address pad 410e, and a sixth address pad 410f. Third and fourth address pads 410c, 410d are positioned equidistantly on either side of first arm 408a of the bias portion of lower layer 420. As a result, third and fourth address pads 410c, 410d form opposing address pads positioned at opposing positions along the perimeter of lower layer 420. In particular embodiments, third address pad 410c is positioned between first bias pad 402a and third bias pad 402c along the perimeter of lower layer 420. Similarly, fourth address pad 410d is positioned between first bias pad 402a and fourth bias pad 402d along the perimeter of lower layer 420.

Fifth and sixth address pads 410e, 410f are configured similarly to third and fourth address pads 410c, 410d, respectively. Thus, fifth and sixth address pads 410e, 410f are positioned equidistantly on either side of first arm 408a such that fifth and sixth address pads 410e, 410f form opposing address pads positioned at opposing positions along the perimeter of lower layer 420. In particular embodiments, fifth address pad 410e is positioned between second bias pad 402b and fifth bias pad 402e along the perimeter of lower layer 420. Similarly, sixth address pad 410f is positioned between second bias pad 402b and sixth bias pad 402f along the perimeter of lower layer 420.

Because each address pad 410a–410f includes a single area 412a–412f, respectively, for the formation of an address via, the metal associated with each address pad 410a–410f is substantially reduced compared to the amount of metal forming the address portions of conventional lower layers in pixel design elements. As a result, narrower leading-edge address pads, such as first and second address pads 410a, 410b, are formed proximate third and fourth corners 406c, 406d. Additionally, for supporting address portions of the middle layer 450 of FIG. 4C, area 412a, area 412c, and area 412e are in substantial alignment with respect to arm 408a of the bias portion of lower layer 420. Similarly, area 412b, area 412d, and area 412f are in substantial alignment with respect to arm 408a of the bias portion of lower layer 420. The advantages achieved by the described configuration of bias portions and address portions of lower layer 420 are described in more detail below.

In the illustrated embodiment of FIG. 4C, middle layer 450, which may be referred to as a beam/hinge or "binge" layer of a DMD pixel element, includes multiple bias portions and multiple address portions for receiving a bias voltage and a control voltage, respectively, from lower layer 420. Specifically, the bias portions of middle layer 450 include multiple beam portions 452 that each have an area 454 for the formation of bias vias (not shown). As discussed above, bias vias conductively couple the bias portions of lower layer 420 with the bias portions of middle layer 450. Accordingly, beam portions 452 are generally configured such that areas 454 are aligned with areas 404 of lower layer 420. Thus, where six bias vias are desired to conductively transport bias voltage from lower layer 420 to middle layer 450, middle layer 450 includes six beam portions 452a–452f. It is generally recognized, however, that fewer or more bias portions 452 may be incorporated into middle layer 450 as is appropriate for the alignment of the bias portions of middle layer 450 with the bias portions of lower layer 420 and for the conductive relay of a bias voltage between the respective layers.

In the illustrated embodiment, the beam portions 452a–452f are configured such that a first beam portion 452a is disposed proximate a first corner 456a of middle layer 450, and a second beam portion 452b is disposed proximate a second corner 456b of middle layer 450. As illustrated, the opposing, first and second beams portions 452a, 452b are coupled by a hinge 458 that extends substantially across the width of the middle layer 450. For conductively receiving a bias voltage from lower layer 420 through a bias via, first area 454a of first beam portion 452a corresponds generally with and is coupled to first area 404a of first bias pad 402a by a bias via (not shown). Similarly, second area 454b of first beam portion 452b corresponds generally with and is coupled to second area 404b of second bias pad 402b by a bias via (not shown).

As illustrated, middle layer 450 also includes floating beam portions that include a third beam portion 452c, a fourth beam portion 452d, a fifth beam portion 452e, and a sixth beam portion 452f. Specifically, third beam portion 452c and fourth beam portion 452d are positioned equidistantly on either side of hinge 458 such that third beam portion 452c and fourth beam portion 452d form opposing beam portions positioned at opposing positions along the perimeter of middle layer 450. Fifth beam portion 452e and sixth beam portion 452f are similarly positioned equidistantly on either side of hinge 458 such that fifth beam portion 452e and sixth beam portion 452f form opposing beam portions positioned at opposing positions along the perimeter of middle layer 450. As illustrated, third beam portion 452c and fifth beam portion 452e are positioned on either side of a third corner 456c, and fourth beam portion 452d and sixth beam portion 452f are positioned on either side of a fourth corner 456d. The resulting configuration generally aligns third-sixth areas 454c–454f associated with third-sixth beam portions 452c–452f with third-sixth areas 404c–404f of lower layer 420 for the conductive transfer of a bias voltage between bias portions of lower layer 420 and bias portions of middle layer 450.

Each of the third-sixth beam portions 452c–452f further include a spring tip 459. Similar to the spring tips described above with respect to conventional DMD pixel designs such as that illustrated in FIGS. 3A–3C, spring tips 459 comprise extensions from third-sixth beam portions 452c–452f. During operation of a DMD pixel element incorporating lower layer 420 and middle layer 450, spring tips 459 provide a landing point for a micro-mirror (not shown). Thus, when the micro-mirror is tilted in the direction of third and fifth beam portions 452c, 452e, the spring tips 459 associated with third and fifth beam portions 452c, 452e may operate as a landing point for the micro-mirror. Conversely, when the micro-mirror is tilted in the direction of fourth and sixth beam portions 452d, 452f, the spring tips 459 associated with fourth and sixth beam portions 452d, 452f may operate as a landing point for the micro-mirror. Thus, the micro-mirror may be tilted in the positive or negative direction until the micro-mirror contacts one or more spring tips 459 extending from third-sixth beam portions 452c–452f.

For receiving a control or address voltage, middle layer 450 also includes address electrodes 460. In the illustrated embodiment, middle layer 450 includes two address electrodes 460a, 460b. A first address electrode 460a is disposed on one side of hinge 458, and a second address electrode 460b is disposed on the other side of hinge 458. Accordingly, first and second address electrodes 460a, 460b are separated by hinge 458. For coupling the address pads 410 of the lower layer 420 to the address electrodes 460 of the middle layer 450, address electrodes 460a, 460b include areas 462 that identify the proximate location for the formation of the address vias (not shown). In the illustrated embodiment, each address electrode 460a, 460b includes three areas 462 for the formation of three address vias. Accordingly, similar to the address portions of lower layer 420, address electrodes 460a, 460b collectively include six areas 462 for the formation of six address vias. As a result, each area 412a–f of the address pads 410 of lower layer 420 are aligned with an areas 462a–f of the address electrodes 460 of middle layer 450. Because the address vias are arranged along the perimeter of the pixel element, the metal associated with each address electrode 460a, 460b is substantially increased compared to the amount of metal forming address portions of middle layers in conventional pixel design elements.

The described configurations of lower layer 420 and middle layer 450 contribute to a unique distribution of metal with respect to the address and bias portions of each layer. For example, the metal associated with the bias and address portions of lower layer 420 are each decreased and more evenly distributed throughout the lower layer 420. As a result, narrower leading-edge address pads are achieved in the lower layer 420. Conversely, the metal associated with the address portions of middle layer 450 is increased, and a wider address electrode is obtained. The result of the described configurations is a shift in the contribution of electrostatic forces produced by the respective layers. Specifically, the contribution of electrostatic forces provided by the lower layer 420 is decreased, and the contribution of electrostatic forces provided by the middle layer 450 is increased. Whereas the address portions of lower layers in conventional pixel designs are very sensitive to translational misalignment of the mirror with respect to the lower layer, the architecture obtained by lower layer 420 and middle layer 450 may operate to significantly reduce the resulting DMD pixel element's sensitivity to translational misalignment since the contribution of electrostatic forces by the address portion of the lower layer 420 are reduced. As a result, the DMD pixel element may exhibit improved performance even where photo induced processes result in translational misalignment of the respective layers.

As an additional advantage, the resulting design results in spring tips 459 of middle layer 450 being disposed further from hinge 458 than in conventional pixel designs. Such a configuration increases the vertical gap between the respective layers and also decreases the resulting DMD pixel element's electrostatic sensitivity. Furthermore, because a more uniform metal density is achieved in the lower layer 420 and the vertical gap associated with the layers is increased, a flatter topography of a mounted micro-mirror may be achieved. As a result, light loss may be reduced and brightness of the displayed image improved.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A micro-mirror element comprising:
a mirror comprising a reflective surface operable to selectively tilt to reflect a beam of light;
a first address portion comprising a plurality of address pads distributed in a first layer of the micro-mirror element, the plurality of address pads non-integral with one another in the first layer, the micro-mirror element having a first side and a second side divided by a hinge, and at least two of the plurality of address pads distributed on the first side;
a second address portion disposed between the first layer and the mirror comprising two address electrodes distributed in a second layer of the micro-mirror element, the first address electrode disposed on the first side and the second address electrode disposed on the second side;
a plurality of address vias operable to conductively couple the first address portion to the second address portion for the transfer of an address voltage from the first address portion to the second address portion, wherein the at least two address pads on the first side are coupled to the first address electrode;
a first bias portion comprising a plurality of bias pads distributed in the first layer of the micro-mirror element, the plurality of bias pads arranged in spaced apart relation to one another, each of the plurality of bias pads conductively coupled to every other bias pad by one or more bias arms;
a second bias portion comprising a plurality of beam portions distributed in the second layer of the micro-mirror element, at least two of the plurality of beam portions coupled together by the hinge;
at least one bias via operable to conductively couple the first bias portion to the second bias portion for the transfer of a bias voltage from the first bias portion to the second bias portion; and
wherein the second address portion provides an electrostatic force on the mirror that is greater than an electrostatic force provided on the mirror by the first address portion.

2. A micro-mirror element comprising:
a first address portion comprising a plurality of address pads distributed in a first layer of the micro-mirror element, the micro-mirror element having a first side and a second side, and at least two of the plurality of address pads distributed on the first side;
a second address portion comprising a plurality of address electrodes distributed in a second layer of the micro-mirror element;
at least one address via operable to conductively couple the first address portion to the second address portion for the transfer of an address voltage from the first address portion to the second address portion; and
wherein the distribution of the address pads of the first address portion and the address electrodes of the second address portion causes an electrostatic force provided by the second address portion to be greater than an electrostatic force provided by the first address portion.

3. The micro-mirror element of claim 2 wherein each of the plurality of address pads are coupled to an associated address via that is operable to transfer an address voltage from the address pad to the second address portion.

4. The micro-mirror element of claim 2 wherein the second address portion comprises a first address electrode and a second address electrode, each of the first and second address electrodes coupled to a plurality of address vias for receiving the address voltage from the first address portion.

5. The micro-mirror element of claim 4, wherein the first side and the second side are divided by a hinge and the first address electrode is disposed on the first side and the second address electrode is disposed on the second side.

6. The micro-mirror element of claim 2, further comprising:
a first, second, and third bias pad distributed in the first layer of the micro-mirror element, the first bias pad including a first bias portion and the second bias pad including a second bias portion; and a main bias signal flow path between the first bias portion and the second bias portion, wherein the third bias pad is operable to conduct a bias voltage to a hinge and does not lie in the main bias signal flow path.

7. The micro-mirror element of claim 6, further comprising: a first beam portion disposed in the second layer, the first beam portion operable to receive the bias voltage from the third bias pad and relay the bias voltage to the hinge.

8. The micro-mirror element of claim 2 further comprising:
a first bias portion comprising a plurality of bias pads distributed in the first layer of the micro-mirror element;
a second bias portion comprising a plurality of beam portions distributed in the second layer of the micro-mirror element; and
at least one bias via operable to conductively couple the first bias portion to the second bias portion for the transfer of a bias voltage from the first bias portion to the second bias portion.

9. The micro-mirror element of claim 8, wherein the bias pads distributed in the first layer are arranged in spaced apart relation to one another.

10. The micro-mirror element of claim 8, wherein
at least one of the plurality of beam portions comprises a contact point for a mirror
of the micro-mirror element when the micro-mirror element is in a tilted position, and
the at least one of the plurality of beam portions is non-integral with the remaining
plurality of beam portions in the second layer.

11. The micro-mirror element of claim 10, wherein the contact point is a spring tip.

12. A micro-mirror element comprising:
a first bias portion comprising a plurality of bias pads distributed in a first layer of the micro-mirror element;
a second bias portion comprising a plurality of beam portions distributed in a second layer of the micro-mirror element, at least one of the plurality of beam portions comprising a contact point for a mirror of the micro-mirror element when the micro-mirror element is in a tilted position, and the at least one of the plurality of beam portions non-integral with the remaining plurality of beam portions in the second layer; and
at least one bias via operable to conductively couple the first bias portion to the second bias portion for the transfer of a bias voltage from the first bias portion to the second bias portion.

13. The image display system of claim 12, wherein the bias pads distributed in the first layer are arranged in spaced apart relation to one another.

14. The image display system of claim 12, wherein:
a first beam portion is disposed in a first corner of the second layer; and
a second beam portion is disposed in a second corner of the second layer, the second corner opposing the first corner, the second beam portion coupled to the first beam portion by a hinge.

15. The image display system of claim 12, wherein the contact point is a spring tip.

16. The micro-mirror element of claim 12, further comprising:
a first address portion comprising a plurality of address pads distributed in the first layer of the micro-mirror element, the micro-mirror element having a first side and a second side;
a second address portion comprising a plurality of address electrodes distributed in the second layer of the micro-mirror element;
at least one address via operable to conductively couple the first address portion to the second address portion for the transfer of an address voltage from the first address portion to the second address portion;
a mirror comprising a reflective surface operable to selectively tilt to reflect a beam of light;
wherein the second address portion provides an electrostatic force on the mirror that is greater than an electrostatic force provided on the mirror by the first address portion, the electrostatic forces provided by the first and second address portions operable to cause the mirror to tilt; and
a light source operable to communicate the beam of light to the digital micro-mirror device for the production of at least a portion of a displayed image.

17. The micro-mirror element of claim 16, wherein at least two of the plurality of address pads distributed on the first side.

18. The image display system of claim 16 wherein each of the plurality of address pads are coupled to an associated address via that is operable to transfer an address voltage from the address pad to the second address portion.

19. The image display system of claim 16 wherein the second address portion comprises a first address electrode and a second address electrode, each of the first and second address electrodes coupled to a plurality of address vias for receiving the address voltage from the first address portion.

20. The image display system of claim 19, wherein the first side and the second side are divided by a hinge and the first address electrode is disposed on the first side and the second address electrode is disposed on the second side.

* * * * *